United States Patent [19]

Wieclawski

[11] Patent Number: 5,795,019
[45] Date of Patent: Aug. 18, 1998

[54] VEHICLE SEAT AND HEADREST ARRANGEMENT

[75] Inventor: Stanislaw Andrzej Wieclawski, Gross-Gerau, Germany

[73] Assignee: Delphi Automotive Ssystems Deutschland GmbH, Wuppertal, Germany

[21] Appl. No.: 827,812

[22] Filed: Apr. 11, 1997

[30] Foreign Application Priority Data

Oct. 9, 1996 [GB] United Kingdom ............ 9621082

[51] Int. Cl.$^6$ ..................................... B60N 2/42
[52] U.S. Cl. ........................ 297/216.12; 297/216.14
[58] Field of Search ..................... 297/391, 404, 297/408, 216.12, 216.13, 216.14, 216.1, 284.1

[56] References Cited

U.S. PATENT DOCUMENTS

| | | | |
|---|---|---|---|
| 2,636,552 | 4/1953 | Long | 297/216.12 X |
| 3,838,870 | 10/1974 | Hug | 280/150 |
| 5,145,233 | 9/1992 | Nagashima | 297/408 |
| 5,378,043 | 1/1995 | Viano et al. | 297/408 |

FOREIGN PATENT DOCUMENTS

| | | |
|---|---|---|
| 0627340 | 12/1994 | European Pat. Off. |
| WO87/03256 | 6/1987 | WIPO |
| WO96/06752 | 3/1996 | WIPO |

Primary Examiner—Milton Nelson, Jr.
Attorney, Agent, or Firm—Patrick M. Griffin

[57] ABSTRACT

A vehicle seat and headrest arrangement (7) comprising a seat back frame (2) having an upper part (24) and a lower part (26), the upper part including a cross-frame member (4), and the lower part including at least a lower portion (28) of a pair of spaced side members (22); a headrest (6) mounted on the cross-frame member; an impact plate (42) positioned between the side members of the lower part and secured to the upper part; pivot hinges (32) connecting the upper part with the lower part and defining a pivot axis (38) about which the upper part and the headrest can pivot in a forward direction, and the impact plate can pivot in a rearward direction, from a normal position; and a spring device (40) biasing the upper part, the headrest and the impact plate to their normal position. The upper part of the seat back and the headrest both pivot towards a vehicle occupant during a rear impact on the vehicle.

1 Claim, 5 Drawing Sheets 5,795,019

1

VEHICLE SEAT AND HEADREST ARRANGEMENT

TECHNICAL FIELD

The present invention relates to a vehicle seat and headrest arrangement.

BACKGROUND OF THE INVENTION

Headrests are known in the vehicle seating art. An example of vehicle seat and headrest arrangement in which the headrest can pivot relative to the seat can be found in U.S. Pat. No. 5,378,043 issued to Viano et al. on Jan. 3, 1995.

The present invention provides a vehicle seat and headrest arrangement which is an alternative to that described in the above mentioned publication with special unique advantages to be explained hereinafter.

SUMMARY OF THE INVENTION

A vehicle seat and headrest arrangement in accordance with the present invention comprises a seat back frame having an upper part and a lower part, the upper part including a cross-frame member, and the lower part including at least a lower portion of a pair of spaced side members; a headrest mounted on the cross-frame member; impact means positioned between the side members of the lower part and secured to the upper part; pivot hinges connecting the upper part with the lower part and defining a pivot axis about which the upper part and the headrest can pivot in a forward direction, and the impact means can pivot in a rearward direction, from a normal position; and spring means biasing the upper part, the headrest and the impact means to their normal position.

BRIEF DESCRIPTION OF THE DRAWINGS

The invention will now be described, by way of example, with reference to the accompanying drawings, in which.

DESCRIPTION OF THE PREFERRED EMBODIMENT

Figure 1:
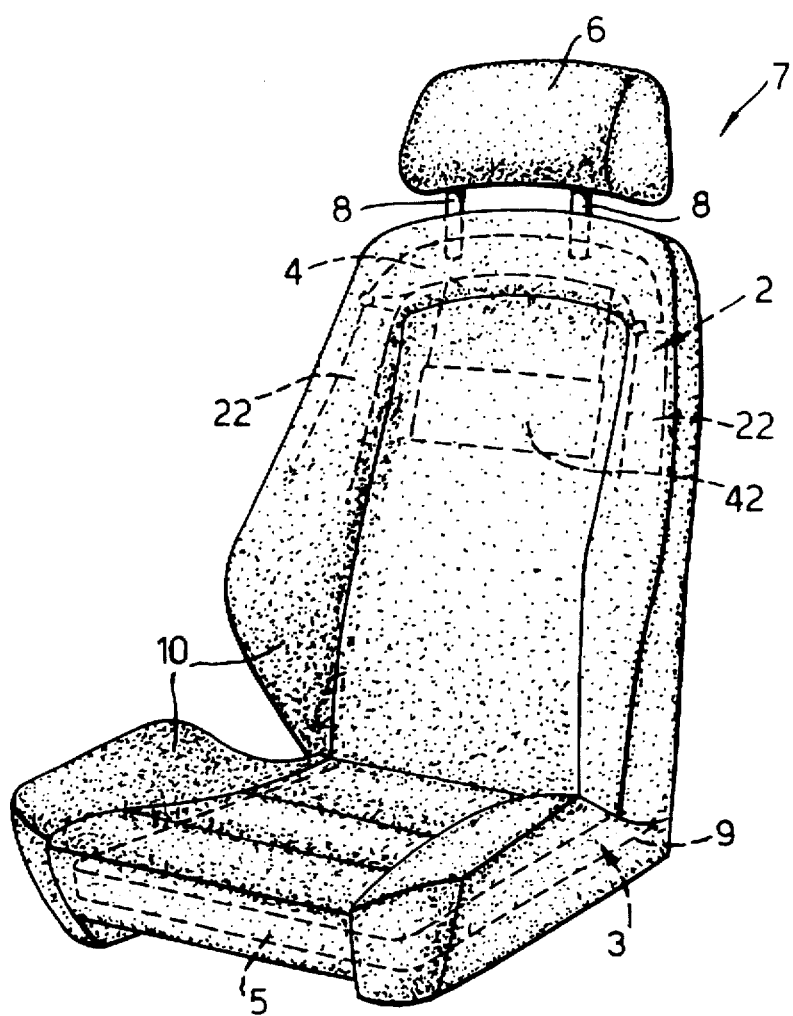
FIG. 1 is a perspective view of a preferred embodiment of a vehicle seat and headrest arrangement according to the present invention.

Referring to FIG. 1, a vehicle seat and headrest arrangement 7 according to the present invention has a seat bun frame 3. The seat bun frame 3 has a front end 5 and a rear end 9 generally positionally aligned with the front and rear of a vehicle (not shown) within which the arrangement 7 is placed. Joined to the seat bun frame 3 substantially adjacent the rear end 9 is a seat back frame 2. The seat back frame 2 is substantially in the shape of an inverted U having two side members 22 joined by a cross-frame member 4, as will be described in more detail below. Typically, the seat bun frame 3 and the seat back frame 2 will be made from steel or other structural metallic members, and will be covered in suitable cushioning material 10. Providing a surface for contact with the head of a vehicle occupant is a headrest 6. The headrest 6 has extending therefrom two posts 8 which are mounted in the cross-frame member 4. The posts 8 may be adjustable vertically with respect to the cross-frame member 4 in a manner conventional for that of vehicle seat headrests.

Figure 2:
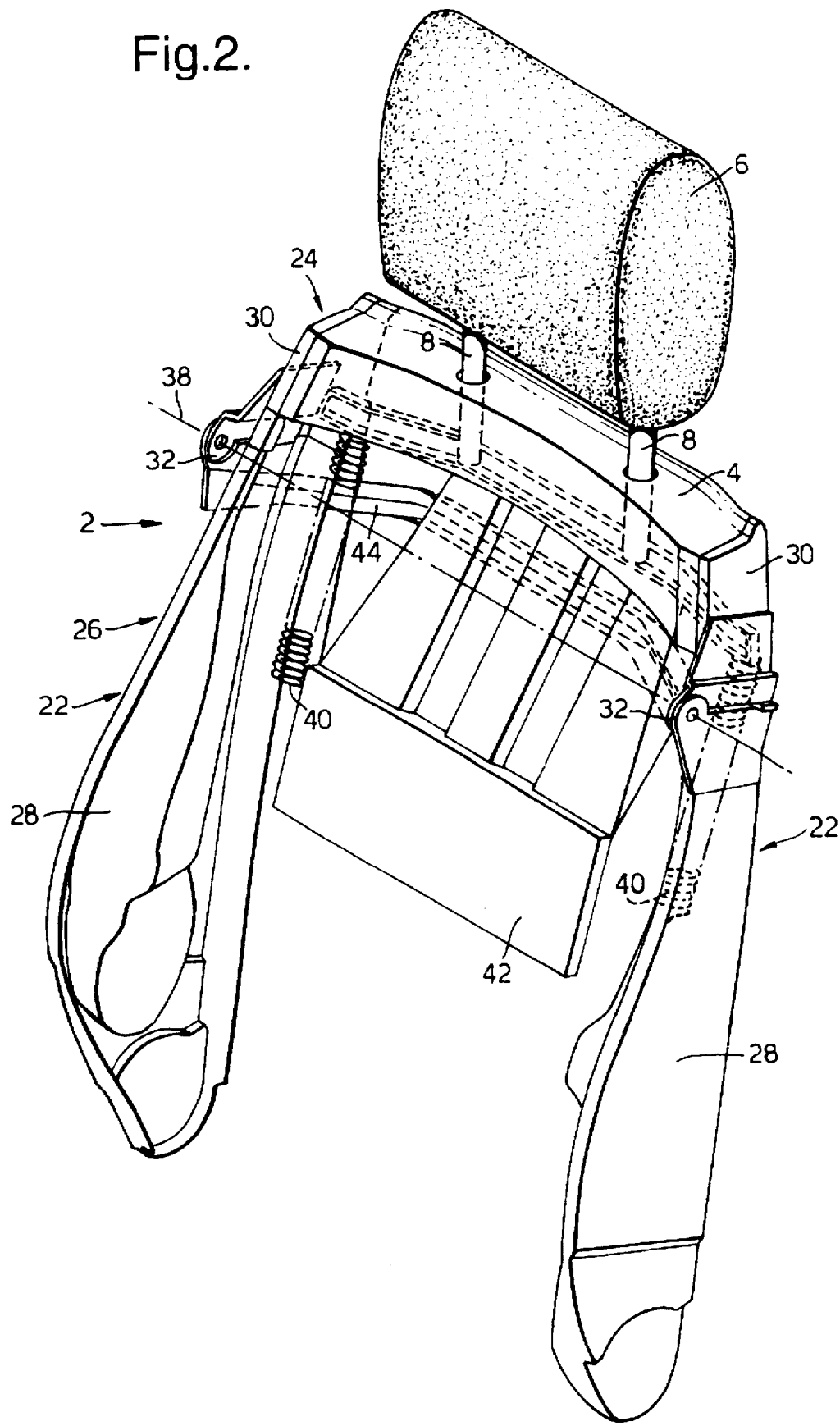
FIG. 2 is an enlarged perspective view of the seat back and headrest of FIG. 1, with portions of the seat back cushion removed for clarity of illustration.
Figure 3:
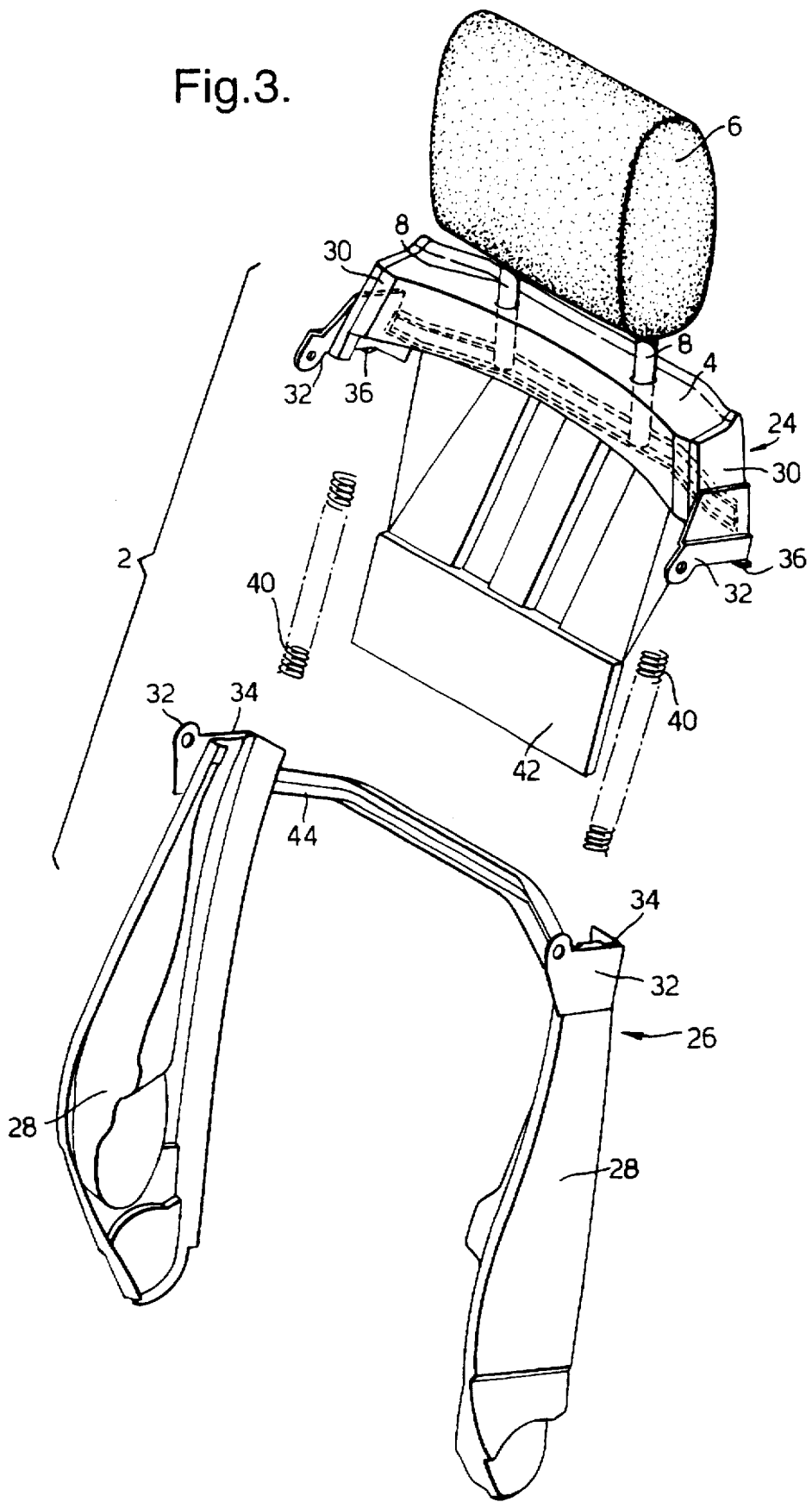
FIG. 3 is an exploded view of the seat back and headrest of FIG. 2.
Figure 4:
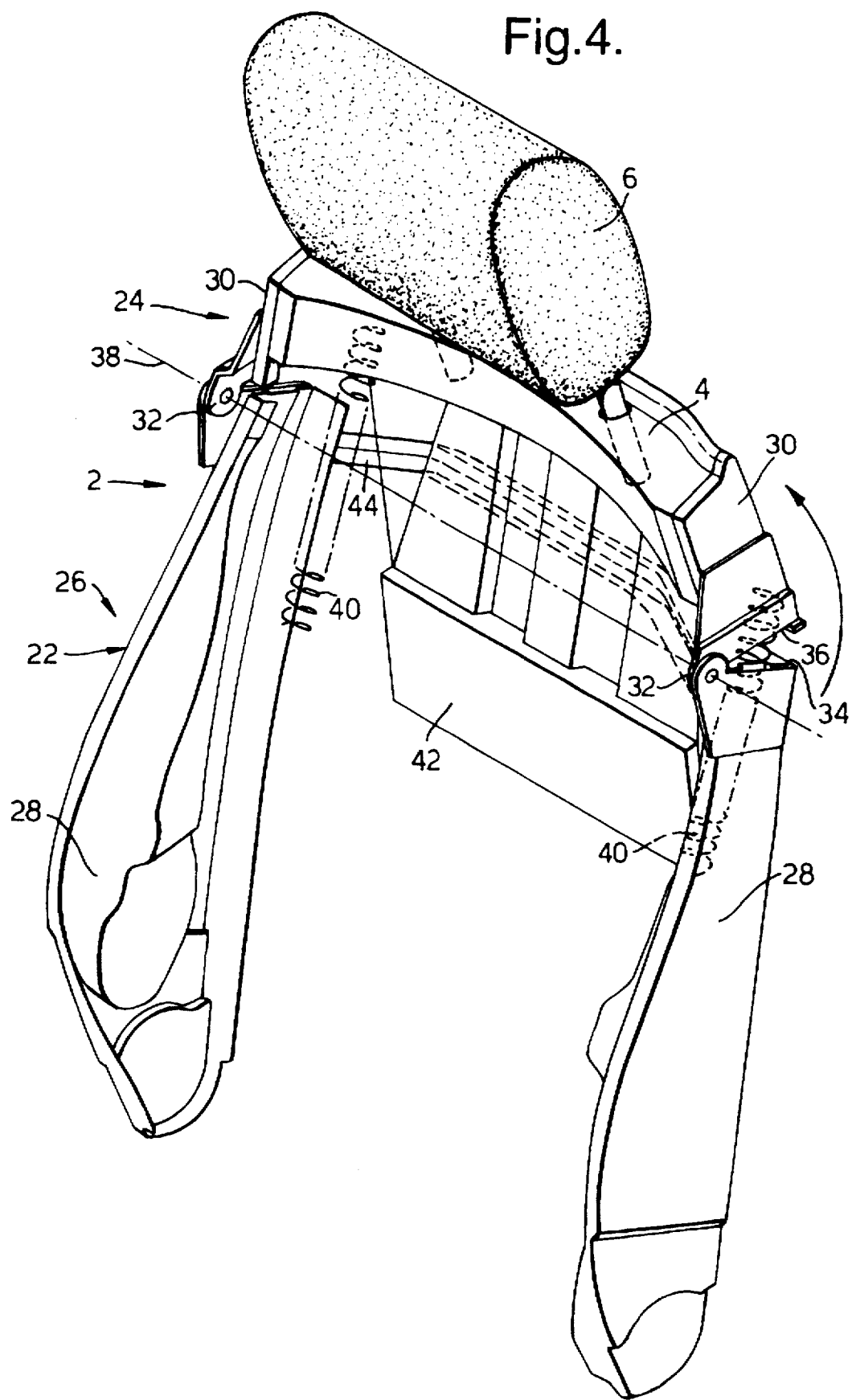
FIG. 4 is a similar view to that of FIG. 2 with the upper part of the seat back and headrest pivoted relative to the lower part of the seat back.

Referring to FIGS. 2 to 4, the seat back frame 2 comprises an upper part 24 and a lower part 26. In this embodiment, each side member 22 comprises a lower portion 28 and an upper portion 30, and the upper portions 30 are rigidly connected to the ends of the cross-frame member 4. Consequently, the upper part 24 of the seat back frame 2 is defined by the cross-frame member 4 and the upper portions 30 of the side members 22, and the lower part 26 is defined by the lower portions 28 of the side members 22. Each upper portion 30 is pivotally mounted on its respective lower portion 28 by way of a pivot hinge 32. The pivot hinges 32 allow the upper part 24 to pivot relative to the lower part 26 from a normal position (as shown in FIG. 2) in a forward direction towards a fully pivoted position (as shown in FIG. 4) about an axis 38. As the headrest 6 is mounted on the cross-frame member 4, the headrest also pivots with the upper part 24 of the seat back frame 2 about axis 38.

Each pivot hinge 32 comprises a pair of stop surfaces 34,36 which engage one another when the upper part 24 is in its normal position to prevent the upper part 24 pivoting in a rearward direction from the normal position relative to the lower part 26. Alternatively, the stop surfaces may be formed on the engaging surfaces on the upper and lower portions 30,28 of the side members 22. A pair of coil springs 40 are positioned adjacent the side member 22 and extend between the cross-frame member 4 and the lower portion 28 of the side members 22. The springs 40 act on the upper part 24 of the seat back frame 2 to bias the upper part to its normal position.

Impact means in the form of a plate 42 is secured to the cross-frame member 4 and is positioned between the side members 22 and below the pivot axis 38. The plate 42 lies in a plane substantially parallel to the plane of the central cushion of the seat back. Rearward loading of the plate 42 (as will be explained in more detail below) causes the plate to pivot about axis 38 in a rearward direction from its normal position as shown in FIG. 2 towards a fully pivoted position as shown in FIG. 4. As the plate is secured to the upper part 24 of the seat back frame 2, the springs 40 also bias the plate 42 to its normal position.

A strengthening bar 44 optionally extends between the upper ends of the lower portions 28 of the side members 22, with the strengthening bar projecting in a rearward direction relative to the side members. As well as acting as a strengthening member for the seat back frame 2, the strengthening bar can also provide a stop to limit the rearward pivoting movement of the plate 42, and hence limit the forward pivoting movement of the upper part 24 of the side back frame 2 and the headrest 6 mounted thereon.

Figure 5:
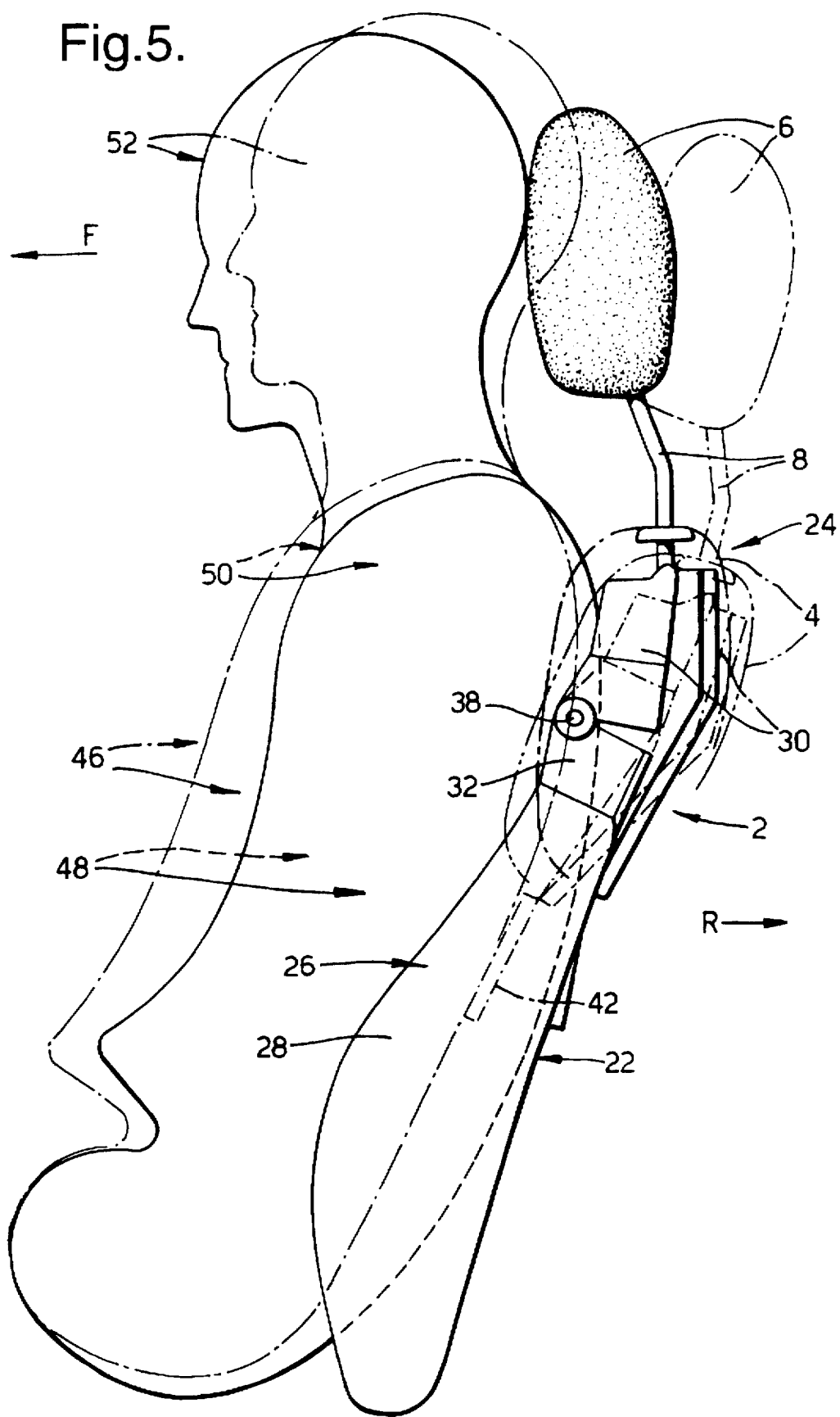
FIG. 5 is a side view illustrating the operation of the present invention.

The operation of the vehicle seat and headrest arrangement 7 will now be described with reference to FIG. 5. The normal position of a vehicle occupant 46 and the normal position of the upper part 24 of the seat back frame 2, the headrest 6 and the impact plate 42 are shown in dotted outline. If the rear of the vehicle is subjected to an impact, the body 48 of the occupant 46 tends to move in a rearward direction R and the shoulders 50 and head 52 tend to move in a forward direction F. The body 48 acts on the impact plate 42 to pivot the impact plate about the axis 38 in a rearward direction. This pivoting movement of the impact plate 42 causes the upper part 24 of the seat back frame 2 and the headrest 6 to pivot about the axis 38 in a forward direction towards the occupant's shoulders 50 and head 52 respectively. The position of the vehicle occupant 46 and the position of the upper part 24 of the seat back frame 2, the headrest 6 and the impact plate 42 after a rear impact are shown in solid outline. As will be apparent, the arrangement 7 of the present invention provides support for the occupant's head 52 and shoulders 50 during a rear impact on the vehicle.

As an alternative to the above described embodiment, the upper portions 30 of the side members 22 may be omitted, with the cross-frame member 4 being pivotally mounted directly on the side member 22. In this arrangement, the upper part 24 of the seat back frame 2 is defined by the cross-frame member 4, and the lower part 26 is defined by the side members 22. In a further alternative, the impact means may be in the form of a wire mat rather than a plate. Still further, springs may be secured between the impact means and the adjacent lower portions 28 to enhance the action of the coil springs 40.

I claim:

1. A vehicle seat and headrest arrangement comprising a seat back frame having an upper part and a lower part, the upper part of the seat back frame comprising a cross-frame member and an upper portion of a pair of spaced side members, and the lower part of the seat back frame including at least a lower portion of the pair of spaced side members; a headrest mounted on the cross-frame member; an impact plate positioned between the side members of the lower part and secured to the upper part; pivot hinges connecting the upper part with the lower part and defining a pivot axis about which the upper part and the headrest can pivot in a forward direction, and in which the impact plate can pivot in a rearward direction, from a normal position; and spring means biasing the upper part, the headrest and the impact plate to their normal position.

* * * * *